March 20, 1973 G. F. ROSS 3,721,912

SHORT TIME ELECTROMAGNETIC WAVE SIGNAL SAMPLING SYSTEM

Filed April 19, 1971 5 Sheets-Sheet 1

INVENTOR
GERALD F. ROSS
BY
H P Terry
ATTORNEY

SHORT TIME ELECTROMAGNETIC WAVE SIGNAL SAMPLING SYSTEM

Filed April 19, 1971 5 Sheets-Sheet 2

INVENTOR
GERALD F. ROSS
BY
H P Ferry
ATTORNEY

SHORT TIME ELECTROMAGNETIC WAVE SIGNAL SAMPLING SYSTEM

Filed April 19, 1971 5 Sheets-Sheet 3

INVENTOR
GERALD F. ROSS
BY
HP Terry
ATTORNEY

March 20, 1973 G. F. ROSS 3,721,912

SHORT TIME ELECTROMAGNETIC WAVE SIGNAL SAMPLING SYSTEM

Filed April 19, 1971 5 Sheets-Sheet 4

INVENTOR
GERALD F. ROSS
BY
H P Terry
ATTORNEY

March 20, 1973 G. F. ROSS 3,721,912

SHORT TIME ELECTROMAGNETIC WAVE SIGNAL SAMPLING SYSTEM

Filed April 19, 1971 5 Sheets-Sheet 5

INVENTOR
GERALD F. ROSS
BY
HP Terry
ATTORNEY

United States Patent Office 3,721,912
Patented Mar. 20, 1973

3,721,912
SHORT TIME ELECTROMAGNETIC WAVE SIGNAL SAMPLING SYSTEM
Gerald F. Ross, Lexington, Mass., assignor to Sperry Rand Corporation
Filed Apr. 19, 1971, Ser. No. 134,991
Int. Cl. H03k 5/13
U.S. Cl. 328—151 13 Claims

ABSTRACT OF THE DISCLOSURE

An electromagnetic wave signal sampling system for taking wave samples of duration of the order of a nanosecond is provided by employment of short-duration, equal and opposite, simultaneous sampling pulses derived within a novel transmission line wave forming network as balanced sampling signals for the operation of a novel balanced transmission line sampling network.

BACKGROUND OF THE INVENTION

(1) Field of the invention

The invention pertains to means for sampling electromagnetic signals and more particularly relates to transmission line apparatus for the precise sampling of radio frequency and other signals, the sampling duration being of the order of a nanosecond or smaller.

(2) Description of the prior art

Generally, prior art signal sampling circuits have been successfully used in the sampling of radio frequency signals where the sampling duration has been much greater in duration than several nanoseconds. Sampling devices of this character have been useful in apparatus for sampling desired video or lower frequency signals, such as in radio location and hyperbolic navigation systems and in sampling oscilloscope apparatus, for instance. Such sampling systems are difficult to modify so that they permit direct and precise nanosecond or subnanosecond sampling of high frequency electromagnetic signals, either continuous wave or pulsed. Most do not depend reliably upon a passive element to determine actual sampling time and duration. Even when modified, they lack fully balanced characteristics and often employ dispersive elements which corrupt the shape of timing signals as well as the signals to be sampled and therefore produce imprecise timing of sampling as well as general distortion of the signal being sampled. For example, a pedestal or other distortion formed by the sampling signal often appears combined with the sampled signal at the prior art sampler output. Most prior art sampling systems lack the balanced type of signal manipulation arrangements needed to avoid such signal distortion and lack signal transmission elements which do not disperse very short duration signals, such as subnanosecond duration pulses. All are incapable of useful operation with base band electromagnetic pulses, whose employment has become of special interest in time domain studies of high frequency networks and in certain other applications wherein the wide spectral content but low total energy of base band signals are of interest.

SUMMARY OF THE INVENTION

The present invention relates to electromagnetic signal sampling apparatus especially for taking precision wave samples of duration of the order of a nanosecond or less. The invention provides balanced transmission line means for forming such short-duration, equal amplitude, opposed simultaneous sampling waves and for supplying them in balanced and undistorted form for the operation of a balanced transmission line signal sampling network.

DESCRIPTION OF THE PREFERRED EMBODIMENTS

Figure 1:
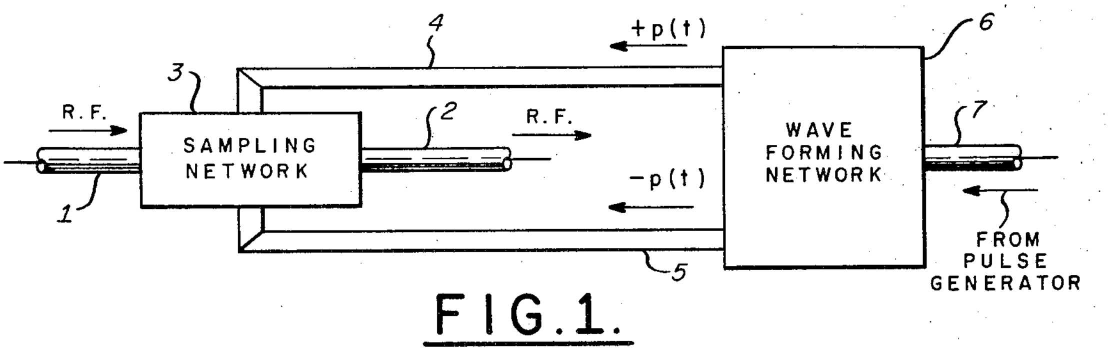
FIG. 1 is a schematic representation of the invention illustrating signal flow paths therein.

Referring to FIG. 1, the novel short-duration signal sampling device is adapted to operate upon a signal such as a high frequency or microwave signal coupled into it via transmission line input 1. The short-duration sample of the input signal, which may be a continuous wave or pulsed signal, exits from the sampling device via transmission line 2 which, like transmission line 1, may be a coaxial transmission line. Actual sampling of the high frequency signal is accomplished by sampling network 3, to be discussed in further detail in connection with FIGS. 2 to 4, and to which balanced, simultaneous inputs in the form of sampling control signals are supplied via transmission lines 4 and 5. These sampling control signals, designated by the symbols $+p(t)$ and $-p(t)$ in FIG. 1, originate in wave forming network 6, further to be discussed in relation to FIGS. 6 and 10, and are designed to have substantially equal and opposite amplitudes when they arrive simultaneously at the control point of the sampling network 3. Signals $+p(t)$ and $-p(t)$ may be generated by wave forming network 6 from an input signal of the form of signal $+p(t)$ and $-p(t)$ may be generated by wave forming network 6 from an input signal of the form of signal $+p(t)$ propagating within input transmission line 7.

The $+p(t)$ signal appearing on input transmission line 7 is, for instance, a positive going nanosecond or subnanosecond duration electromagnetic energy pulse of the base-band type. Such signals are readily produced by a conventional transmitter of the kind having a delay line configuration adjustable in such a way as to produce very short duration electromagnetic pulses. Devices for producing short base-band pulses are also disclosed by G. F. Ross in the U.S. Pat. 3,402,370 for a "Pulse Generator," issued Nov. 30, 1965, and in the U.S. Pat. 3,495,190 for a "Microwave Phase Equalization Network," issued Feb. 10, 1970, both being assigned to the Sperry Rand Corporation. Where the present invention is employed with a short base-band transmitter, the $+p(t)$ signal may be derived in a conventional way by coupling energy from a base-band pulse propagating element of a transmitter of the integrated type disclosed by G. F. Ross et al. in the U.S. patent application Ser. No. 46,079 for a "Balanced Radiation System," filed June 15, 1970, or in the G. F. Ross et al. patent application Ser. No. 123,533 for a "Short Base-Band Communication System," filed Mar. 12, 1971, both patent applications being assigned to the Sperry Rand Corporation. Other disclosures appear in the prior art of magnetically controlled mercury reed switch systems designed to initiate formation of subnanosecond impulses in charged wave propagation systems; a switch of the kind disclosed by K. W. Robbins and G. F. Ross in the U.S. Pat. 3,569,877 for a "High Frequency Switch," issued Mar. 9, 1971, and assigned to the Sperry Rand Corporation, is suitable.

Figure 2:
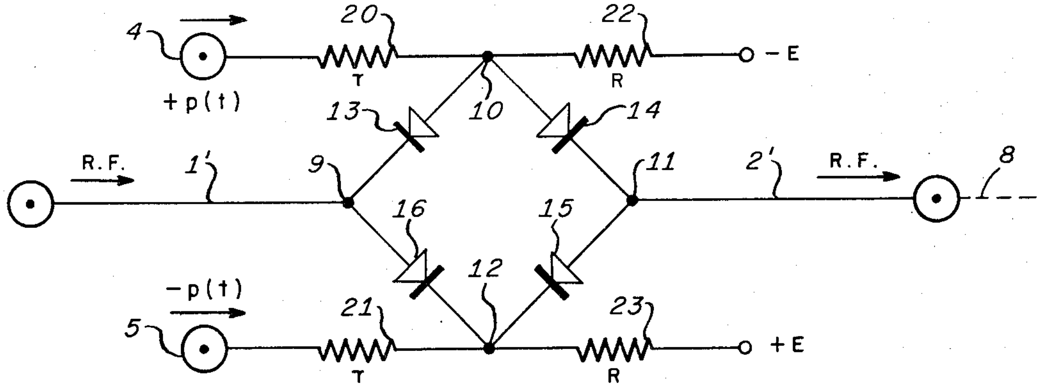
FIG. 2 is an equivalent circuit of the wave sampling network of FIG. 1.
Figure 3:
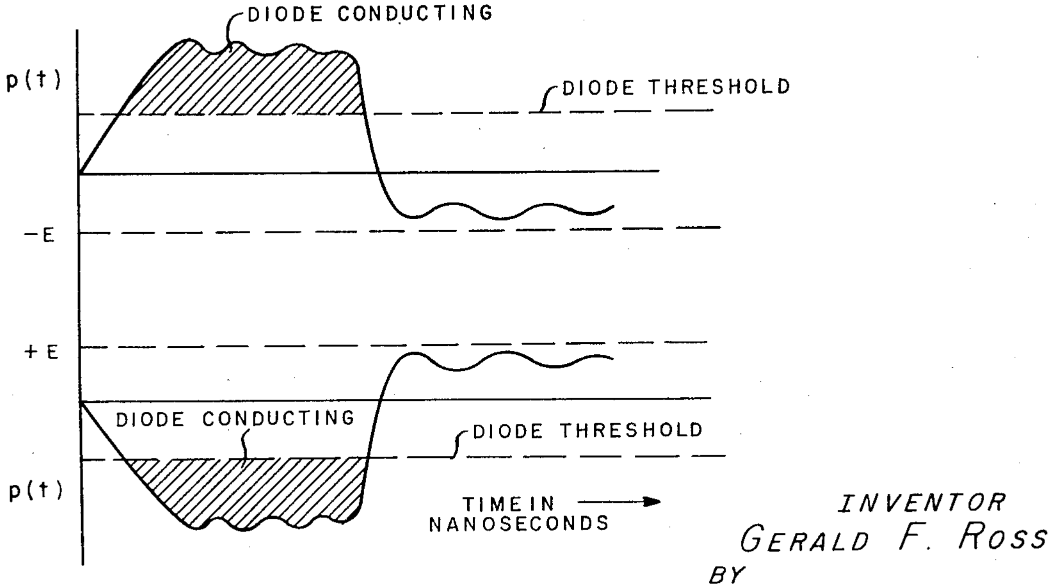
FIG. 3 is a wave form diagram useful in explaining the operation of the circuit of FIG. 2.

The basic circuit of the sampling network 3 takes the form of the balanced bridge circuit shown in FIG. 2 where, for convenience, the coaxial transmission lines 1 and 2 of FIG. 1 are represented only by their inner conductors 1', 2'. Conductors 1' and 2' lie in the plane of zero sampling potential of the network as indicated by the dotted line 8. Network 3 further comprises a four-armed bridge with arms coupling junctions 9, 10, 11, 12 through respective diodes 13, 14, 15, 16, the diodes being poled as indicated in the figure. Junction 9 is coupled to input conductor 1' while junction 11 is coupled to output conductor 2'.

The intermediate junctions 10 and 12 are respectively supplied with sampling control signals via transmission lines 4 and 5. For example, the short duration of subnanosecond signal $+p(t)$ is supplied by line 4 via isolation resistor 20 to junction 10; likewise, the short-duration subnanosecond signal $-p(t)$ is coupled by line 5 through the similar resistor 21 to junction 12. Resistors 20 and 21 may have a resistance value *r*, for example, of about 250 ohms. Junction 10 is supplied with a unidirectional bias voltage —E via bias regulating resistor 22, while junction 12 is supplied with an equal but oppositely poled voltage +E via similar resistor 23. The resistance R of bias regulating resistors 22 and 23 will depend upon the characteristics of the selected diodes 13 to 16.

Diodes 13 to 16 are preferably of the type known as fast-switching barrier or hot carrier semiconductor diodes particularly suited to very high frequency applications where low noise properties, uniformity, and reliability are desired. The voltages +E and —E normally bias the fast acting diodes in their non-conducting states. As in FIG. 3, the application of voltages $+p(t)$ and $-p(t)$ of similar shape, magnitude, and time durations to the sampling network 3, whereby the respective bias levels of the diodes are exceeded, causes the diodes simultaneously to conduct. Such an event permits the high frequency input signal on input transmission line 1 to flow out through output transmission line 2. The duration of the sampled outflow is the same as the duration of current flow through the diodes 13 to 16. None of the sampling signal $+p(t)$ or $-p(t)$ appears at the output port of line 2 because of the location of equipotential line 8. The value of resistor *r* may be varied, though if *r* is larger than the relatively non-critical optimum value, the magnitudes of pulses $+p(t)$ and $-p(t)$ must be increased. For relatively smaller values of resistance *r*, the baseband pulse generator feeding transmission line 7 may undesirably load the input line 1 and the output line 2.

Figure 4:
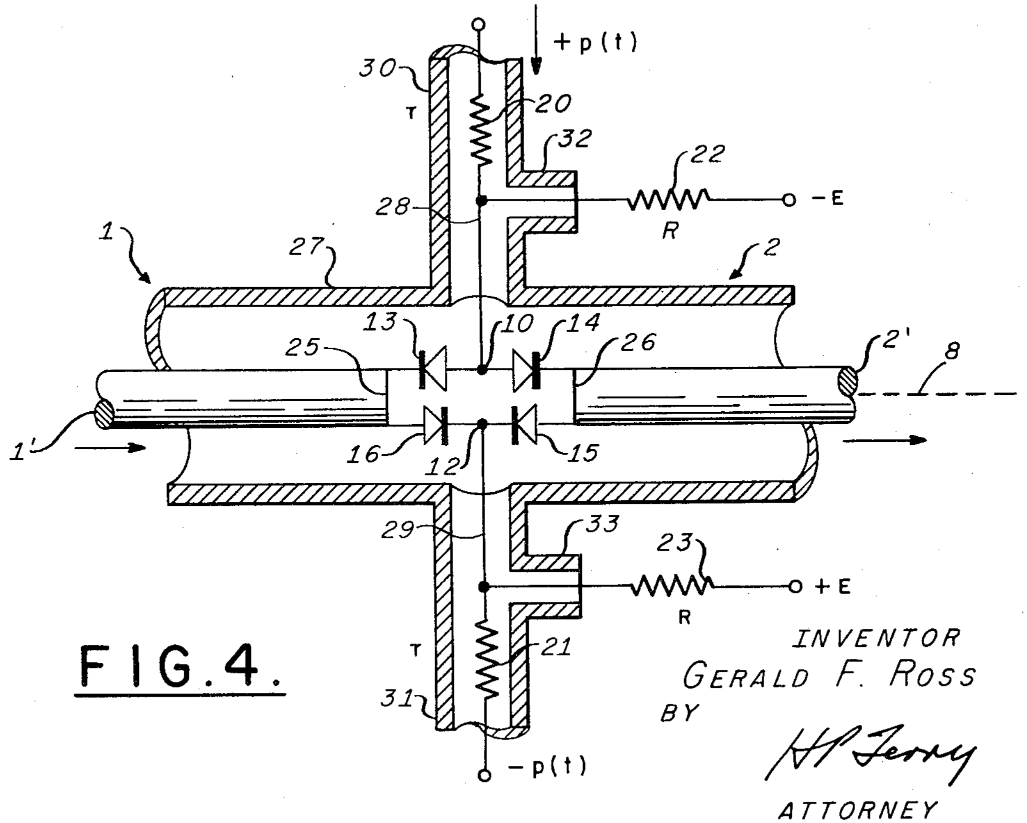
FIG. 4 is a view partly in cross section of one embodiment of the circuit of FIG. 2.

A further embodiment of the short-duration or subnanosecond sampling network 3 arranged in coaxial transmission line is shown in FIG. 4; analogous circuit elements bear similar reference numerals in FIGS. 2 and 4, including inner conductors 1' and 2', junctions 10 and 12, diodes 13 to 16, and resistors 20 to 23. The connection of diodes 13 and 14 to the respective ends 25 and 26 of conductors 1', 2' is now along a first straight line path at points on the peripheries of conductors 1', 2'. Likewise, the connections of diodes 15 and 16 to the respective ends 25 and 26 of inner conductors 1', 2' is now along a second straight line path at points on the peripheries of conductors 1', 2' spaced 180 angular degrees from the first path. It is seen that the inner conductor ends 25 and 26 now respectively correspond to junctions 9 and 11 of FIG. 2.

In FIG. 4, the purpose of the outer conductor of transmission lines 1, 2 is served in common by hollow conductor 27. Conductor 27 has opposed openings through which leads 28 and 28 branching perpendicularly from junctions 10 and 12 are respectively accommodated. The lead 28 from junction 10 couples to resistor 20 and thus to the source of the $+p(t)$ signal. Likewise, the lead 29 from junction 12 couples to resistor 21 and thus to the source of the $-p(t)$ signal. Lead 28 and resistor 20 lie within a first relatively small branching outer conductor 30. Likewise, lead 29 and resistor 21 lie within an oppositely disposed second relatively small branching outer conductor 31. Openings 32 and 33 in the respective outer conductors 30 and 31 permit connection of bias regulating resistors 22 and 23 to the respective leads 28 and 29, thereby assuring application of the respective bias voltages —E and +E. It will be understood that the proportions used in the drawing of FIG. 4 are used for the purpose of providing clarity in the drawing, and do not necessarily represent proportions which would be used in actual practice.

Operation of the sampling circuit of FIG. 4 is substantially similar to that of FIG. 2. In both circuits, diodes 13 to 16 are selected for permitting proper balance of the circuit. Commercially available diodes of the type suitable for use as diodes 13 to 16 are not fully ideal, since they exhibit slight capacitive characteristics in the non-conducting state, and therefore selection of matched diodes is preferred.

Figure 5:
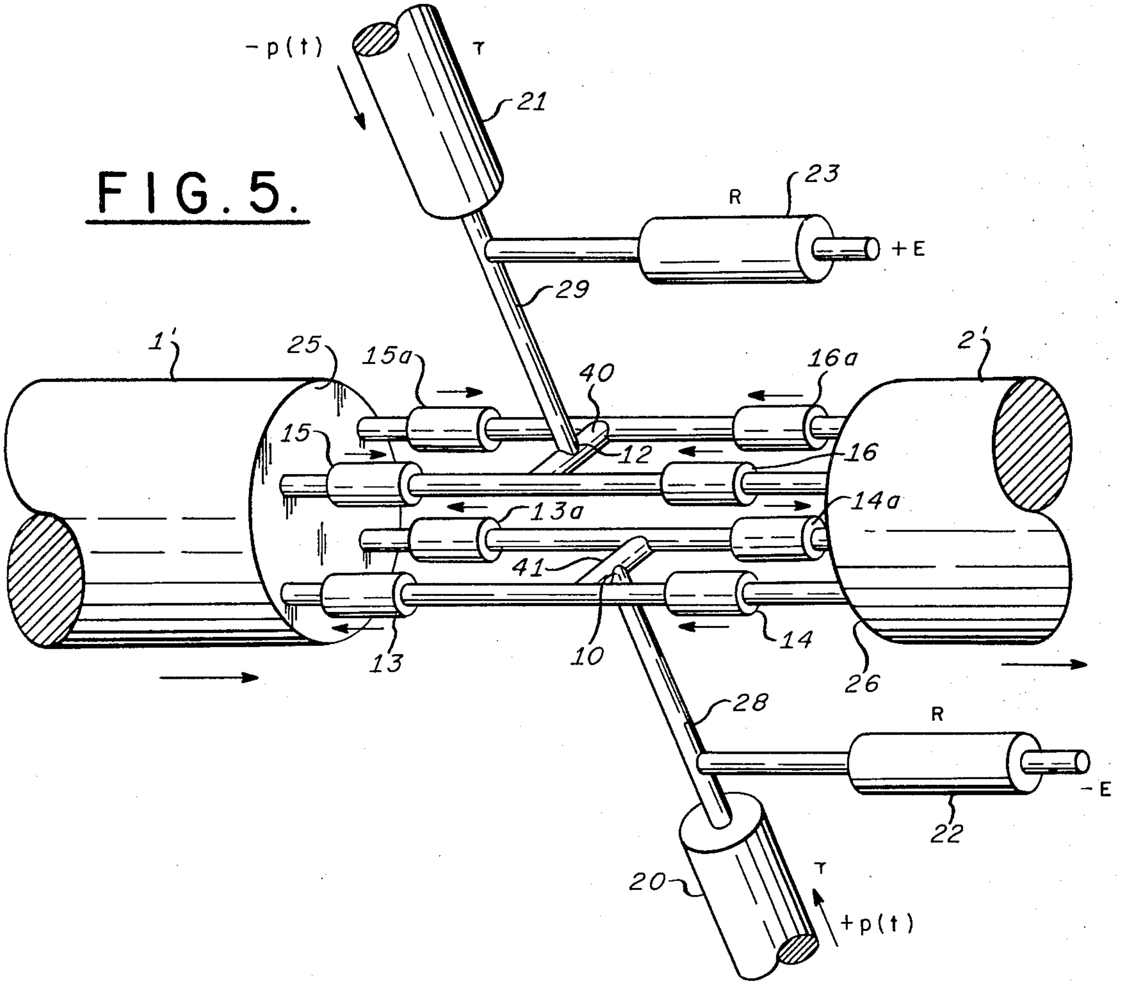
FIG. 5 is a fragmentary perspective view of a further embodiment of the device of FIG. 2.

While two cooperating conducting paths with pairs of diodes, as diodes 13 and 14 and diodes 15 and 16 of FIG. 4, may be employed, it is preferred to use additional diodes in additional conducting paths between conductors 1', 2', as in FIG. 5, where a total of eight diodes comprises the bridge network. Use of more than two such conducting paths aids in maintaining substantially smooth impedance characteristics in the region between the conductors 1', 2', thus reducing reflected energy and dispersion of the signals propagating from conductor 1' to conductor 2'. Substantially all energy is propagated in coaxial transmission lines 1, 2 of FIGS. 4 and 5 in the TEM mode, the preferred mode since it is the substantially dispersionless propagation mode.

In the embodiment of FIG. 5, elements analogous to those appearing in FIGS. 2 and 4 again bear the same reference numerals, including inner conductors 1' and 2', junctions 10 and 12, diodes 13 to 16, resistors 20 to 23, conductor ends 25 and 26, and leads 28 and 29. The respective diode conduction paths are now separated by 90 angular degrees. For example, diodes **15*a* and 16*a* are poled similarly to diodes 15 and 16 and form a path between conductors 1' and 2' that is 90 angular degrees from the path formed by diodes 15 and 16. The junction 12 with conductor 29 is formed on a conductor 40 connected to the midpoint between diodes 15 and 16 and to the midpoint between diodes 15*a* and 16*a*. In similar fashion, diodes 13*a* and 14*a* are poled similarly to diodes 13 and 14 and form a further path between conductors 1' and 2', spaced 90 angular degrees from diodes 15*a* and 16*a* and also 90 angular degrees from diodes 13 and 14. The junction 10 with conductor 28 is formed on a conductor 41 connected from the midpoint between diodes 13 and 14 to the midpoint between diodes 13*a* and 14*a*. It will be understood by those skilled in the art that outer conductors 27, 30, and 31 and their associated elements are preferably also employed in the embodiment of FIG. 5 and are omitted in the drawing merely for the sake of presenting a clear view of the diode connections between conductors 1', 2'** and associated elements. It will be understood that the proportions used in the drawings of FIG. 6 are used for the purpose of providing clarity in the drawing, and do not necessarily represent proportions which would be used in actual practice.

Figure 6:
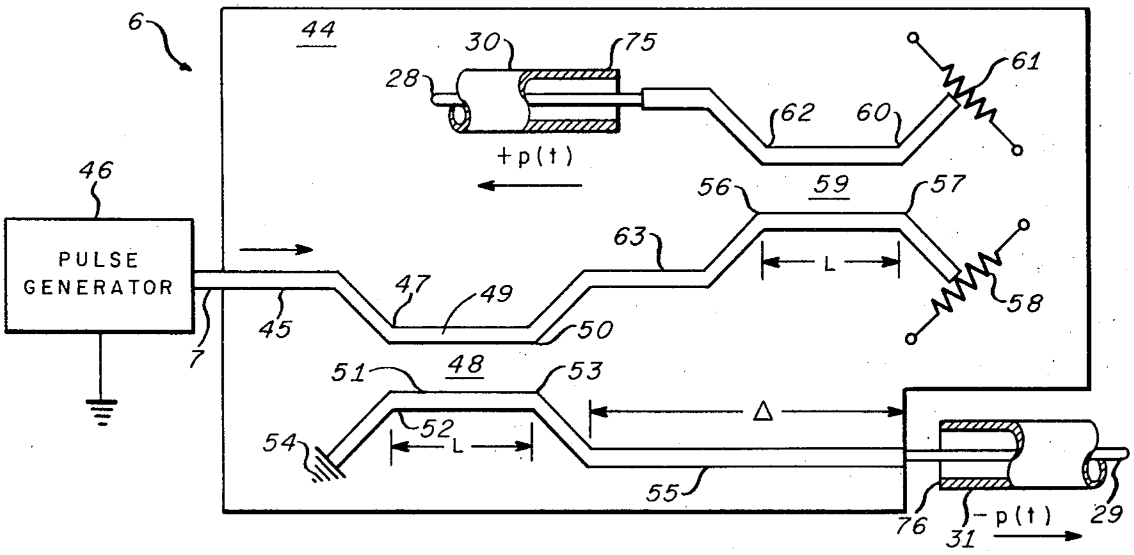
FIG. 6 is a plan view, partly in cross section, of a first embodiment of the wave forming network of FIG. 1.

Turning now to the wave forming network 6 of FIG. 1, one embodiment of the network device for simultaneous generation of the short duration or subnanosecond signals $+p(t)$ and $-p(t)$ is shown in FIG. 6. As noted above, wave forming network 6 is a device which is capable of converting the unbalanced input $+p(t)$ signal appearing within coaxial line 7 of FIG. 1 into the balanced output signals $+p(t)$ and $-p(t)$ respectively to be propagated in transmission lines 4 and 5. The wave forming network device 6 may therefore be called a time domain balun, being adapted to accomplish the above conversion without dispersion or smearing of subnanosecond or base-band energy pulses.

The transmission line system of the wave forming device 6 may be bonded to the upper surface 44 of a dielectric substrate, while a relatively thin conductive ground sheet (not shown) is bonded to the second or opposite surface of the dielectric sheet in the well known manner. The dielectric substrate may be a pure aluminum oxide substrate or other similar low-loss ceramic substrate of a thickness from 0.025 to 0.055 inch, for example. The conductive transmission line elements may be constituted of a relatively thin layer of a good high frequency conductor such as gold or silver placed on the dielectric by any one of several known procedures, including the procedure presented by R. M. Denhard in the U.S. patent application Ser. No. 14,415 for "Microwave Microcircuit Element With Resistive High Frequency Energy Absorber," filed Feb. 26, 1970, issued as Pat. 3,585,533, June 15, 1971, and assigned to the Sperry Rand Corporation.

The wave forming network 6 of FIGS. 1 and 6 comprises an input transmission line 45 adapted to be coupled in an impedance matched fashion to the output transmission line 7 of a base-band pulse generator 46, as previously described. Input transmission line 45 is coupled to the input port 47 of planar microcircuit directional coupler 48 having a characteristic coupling coefficient $k$ and a coupling region of effective length L. The coupled line portion 49, also of length L, ends at port 50. Arranged in parallel spaced relation with the first coupled line portion 49 is a second coupled line portion 51, also of length L, spaced from the first coupled line portion 49 according to the desired value of $k$, and having ports 52 and 53. Port 52 is grounded at 54 by a shorting termination. On the other hand, port 53 is coupled to a transmission line section 55 of length $\Delta$, as will be explained, and is then coupled to the coaxial line inner conductor 29 associated with the outer coaxial line conductor 31 of FIG. 4, for example. The outer conductor 31 is preferably conductively coupled in a conventional manner to the conductive ground plane beneath the dielectric substrate 44 of the planar microcircuit.

Port 50, associated with the first coupling region 49 of directional coupler 48 is connected by transmission line 63 to port 56 of directional coupler 59. Coupler 59 is similar to coupler 48, having ports 56, 57, 60, and 62 and having a coupling region again of length L and coupling coefficient $k$. However, port 57 of coupler 59 is provided with a matched lossy termination 58. Since termination 58 may take any of several well known forms used in microwave microcircuits, it is simply represented in the drawing in the conventional manner as a resistor. It may, for example, be fabricated generally as described in the above mentioned U.S. patent application Ser. No. 14,415 to R. M. Denhard. In a similar way, port 60 is also supplied with a matched lossy termination 61. Port 62, in a manner similar to port 53 of coupler 48, is attached to the coaxial line inner conductor 28 associated with the outer coaxial line conductor 30 of FIG. 4. Outer conductor 30 may be conductively coupled to the ground plane conductor lying beneath the dielectric substrate 44 of the planar microcircuit.

Figure 8:
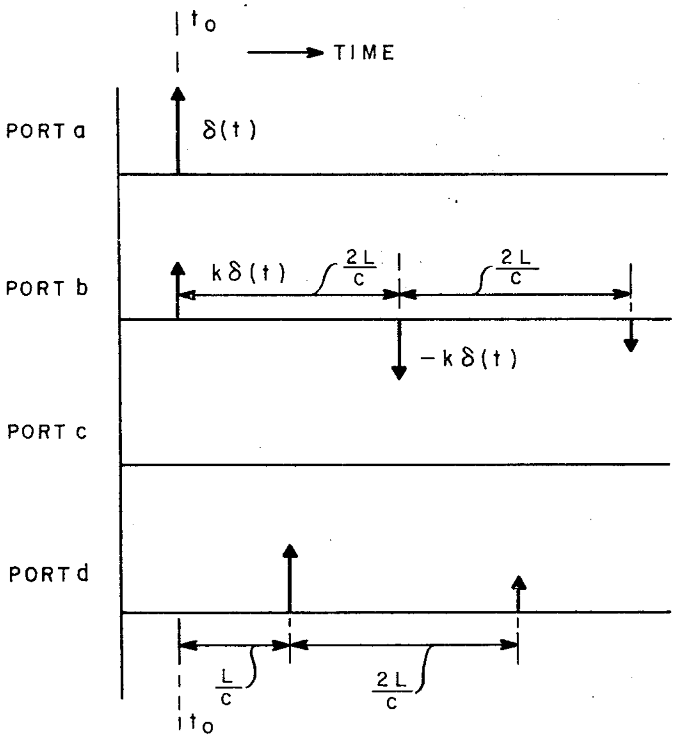
FIG. 8 is a series of graphs useful in explaining the operation of the element of FIG. 7.
Figure 7:
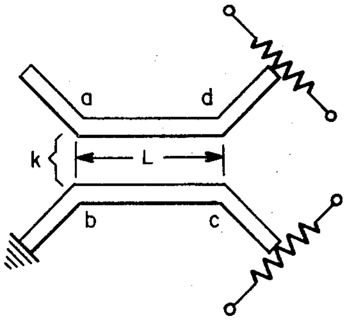
FIG. 7 is a plan view of an element employed in FIG. 6.

Operation of the wave forming network with respect to a base-band pulse injected on transmission line 45 may be explained by observation of the characteristics of the typical coupler of FIG. 7 having an input port $a$, a matched port $b$, and ports $c$ and $d$ each provided with matching lossy terminations. Consider the input at time $t_0$ of an ideal impulse of $\delta(t)$ volt-seconds amplitude as indicated in FIG. 8 at input port $a$. The impulse at port $a$ is coupled to ports $b$ and $d$, while no energy, to a first order, appears at port $c$. At port $b$, the signal consists of positive and negative impulses, diminished in amplitude according to the coupling factor $k$ and separated in time by $2L/c$ seconds, where L is again the indicated effective length of the coupling region, and $c$ is the velocity of propagation of electromagnetic energy along the planar transmission line of the coupler. If at port $b$ the signal is fed into a shorted arm (where it is inverted in polarity and reflected), then a portion of the reflected wave is simply coupled back to the input port $a$ and is absorbed in the generator feeding port $a$, while the remainder is transmitted to port $c$. The initial impulse after being coupled to port $b$ is fed directly to port $d$ after a delay of $L/c$ seconds, as seen in FIG. 8.

Figure 9A:
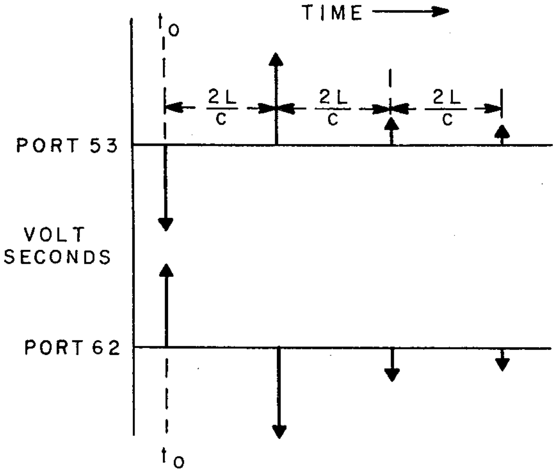
FIGS. 9A and 9B are graphs useful in explaining the operation of the apparatus shown in FIG. 6.

Accordingly, in the operation of couplers 48 and 59, an impulse is fed by generator 46 to port 47 of coupler 48, coupling a version of the signal to port 52, where it is inverted and reflected by short circuit 54. Part of the reflected signal is coupled back to the input port 47 to be absorbed in generator 46, while the remainder is transmitted to port 53 and to coaxial output line 29, 31 through delay 55 as the useful output $-p(t)$ as seen in FIG. 9A. The initial impulse supplied by generator 46 is fed directly to port 50 and, in turn, to the input port 56 of the second directional coupler 59. Accordingly, the signal at port 56 is coupled to port 62 in a similar manner as the useful signal $+p(t)$ for excitation of the coaxial line 28, 30 as seen in FIG. 9A. The two desired output signals, $+p(t)$ and $-p(t)$, each traverse one coupled and one direct path. The virtually identical couplers 48 and 59 may be deposited over the same substrate and same ground plane, using any of several well known techniques permitting exact duplication of microcircuits from the same master. The delay time $\Delta$ of delay 55 is chosen so that $+p(t)$ and $-p(t)$ arrive at outputs transmission lines 28, 30 and 29, 31 simultaneously, or, more important, permitting their simultaneous action upon diodes 13, 14 and 15, 16 of FIG. 4, for example.

Figure 9B:
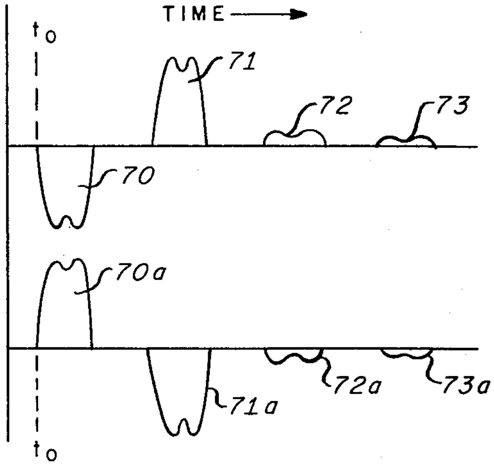

While ideal impulses have been discussed in relation to FIGS. 8 and 9A, it is clear that non-ideal pulses behave in like manner. For example, the polarity of non-ideal short duration or subnanosecond pulses and their arrival timing at ports 53 and 62 is represented in FIG. 9B. In applying the signals of FIG. 9B to the diode bridge of FIG. 4, for example, it is clear that only pulses 70 and 70$a$ may cause the diodes of the bridge to conduct and to permit high frequency energy to pass from input transmission line 1 to output line 2. All other pulses, such as pulses 71, 71$a$, 72, 72$a$, 73 and 73$a$ have the wrong polarity and only tend to ensure that the bridge will not conduct. Further, since pulse 71$a$ is an inverted replica of pulse 71, these unused pulses can cause no sampling transient in the gated output appearing on transmission line 2.

It should be noted that transmission of a base-band or subnanosecond pulse from generator 46 through the system associated with directional couplers 48 and 59 is by a medium affording energy transmission substantially solely in the TEM mode, and that no propagation modes are employed permitting dispersion or smearing of the short duration or subnanosecond pulses. Thus, the energy even of subnanosecond pulses is efficiently directed to use in the sampling network 3. It should further be noted that the respective junctions 75, 76 between the planar transmission lines of the microciruit and coaxial lines 28, 30 and 29, 31 may be made according to standard designs for permitting substantially exact impedance matches over a wide frequency band. Furthermore, it will also be recognized by those skilled in the art that the proportions used in the drawing of FIG. 6 are used for the purpose of providing clarity in the drawing, and do not necessarily represent proportions that would be used in actual practice.

The wave forming network or time domain balun 6 of FIG. 6 has the advantage of low cost and stability attendant microcircuit structures, its stable sampling time being inherently controlled by the length L of the coupling regions of couplers 48, 59. In many applications of particular interest, such as in target echo range gating or in the art of sampling oscillography, very short or subnanosecond gating periods or sampling windows are desired. However, in some distance measurement applications, for example, sampling times as great as several nanoseconds are found useful, requiring couplers of inconvenient length. The wave forming network or time domain balun of FIGS. 10, 11A, and 11B fills such such needs.

Figure 10:
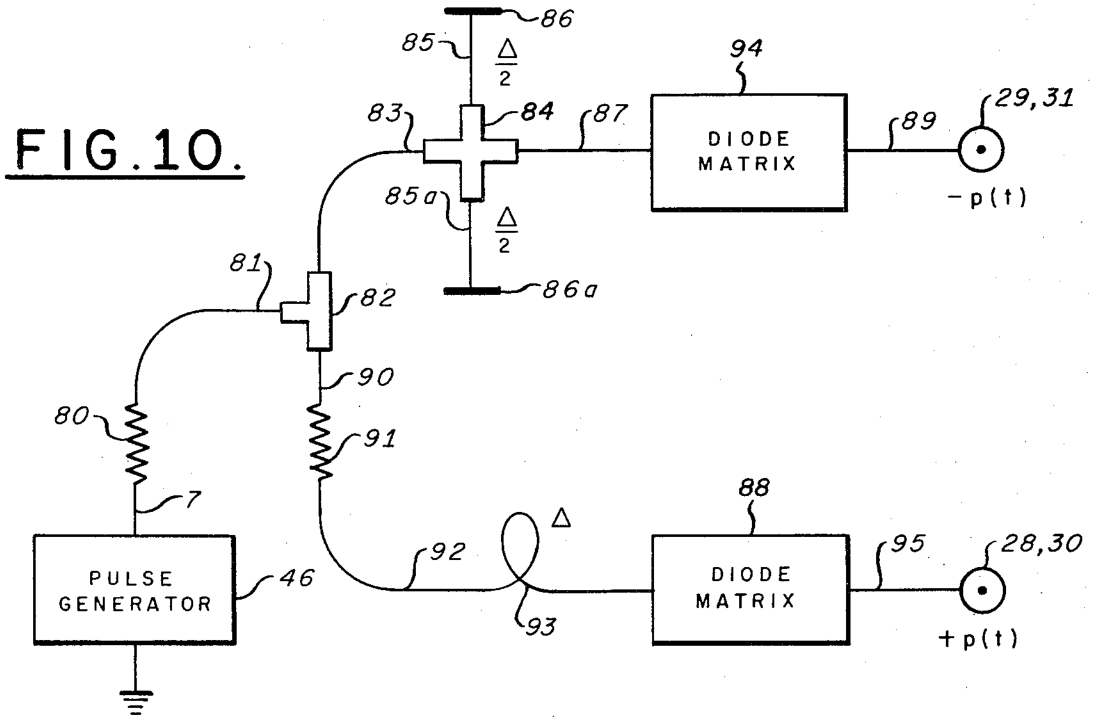
FIG. 10 is a plan view of a further embodiment of the apparatus of FIG. 6.

In FIG. 10, a signal propagating system is shown represented largely as a single wire transmission line system, though it should be recognized that the single wire may be the inner conductor of a coaxial line or that it may be a conventional planar transmission line. In FIG. 10, the output line 7 of pulse generator 46 may be supplied through a level setting resistor 80 via line 81 to the input branch of a T junction 82 having two output branches. A first output branch of T 82 is coupled by transmission line 83 to a first signal channel for producing the signal $-p(t)$, while a second output branch of T 82 is coupled by transmission line 90 to a second signal channel for producing the signal $+p(t)$.

Transmission line 83 couples to an input of a quadruply branched junction 84 having an output branch coupled to line 87. The remaining opposite branches of junction 84 couple to respective transmission lines 85 and 85*a*, each shorter at its outer end, as by short circuiting devices 86, 86*a*, and each having lengths of $\Delta/2$, where the value of $\Delta$ is yet to be explained. The output transmission line 87 is coupled to diode matrix 94, yet to be explained in connection with FIG. 11B. The output $-p(t)$ of matrix 94 may be coupled by line 89 to the coaxial line 29, 31 of FIG. 4, for example.

Transmission line 90 is coupled to an attenuator 91 and thence via transmision line 92 and delay 93 to diode matrix 88. Delay 93 has a characteristic delay time $\Delta$ related to the delay characteristics of branch lines 85 and 85*a*. Diode matrix 88, yet to be explained in connection with FIG. 11A, provides an output $+p(t)$ on transmission line 95 that may be coupled to the coaxial transmission line 28, 30 of FIG. 4.

Figures 11A, 11B:
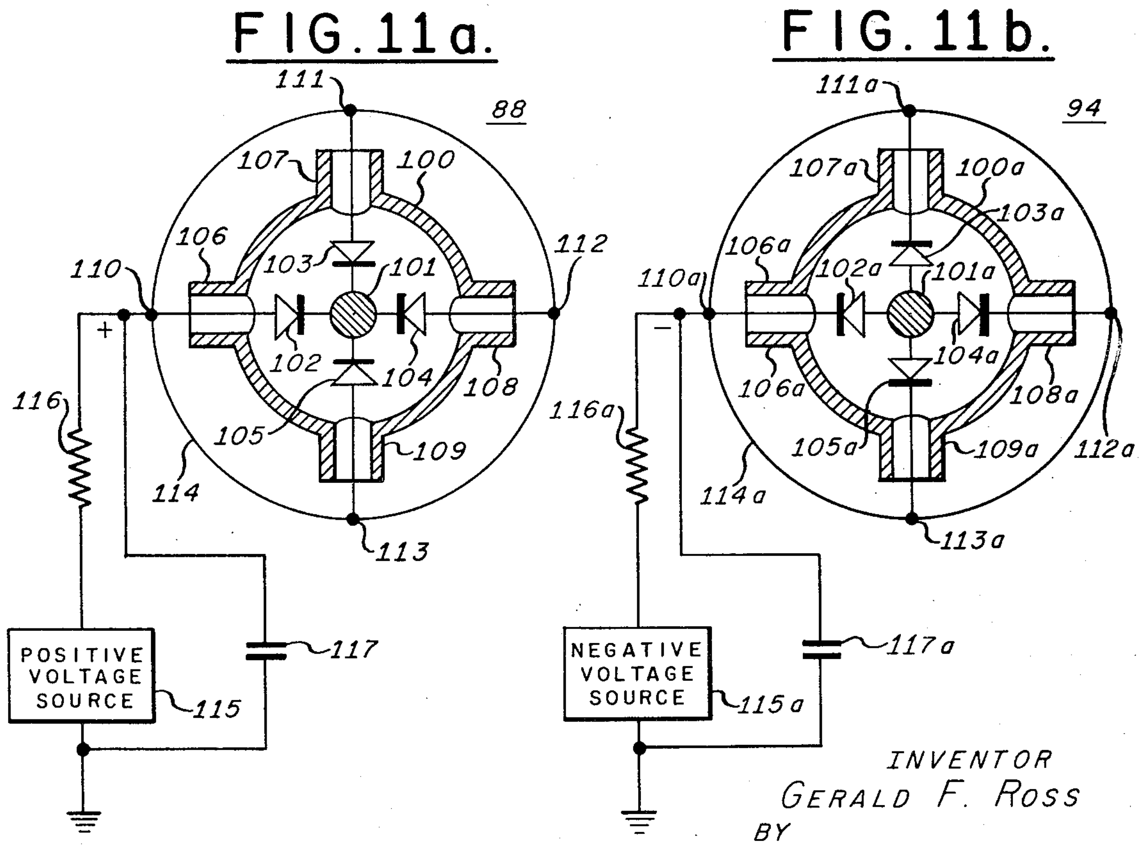
FIGS. 11A and 11B are cross section views of elements employed in FIG. 10.

Diode matrices 88 and 94 are similar devices as indicated respectively in FIGS. 11A and 11B. Matrices 88 and 94 are comprised of similar elements, so that reference numerals are used in FIG. 11B exactly corresponding to those used in FIG. 11A. but with the letter "*a*" suffixed to them, so as to indicate such correspondence.

In FIG. 11A, diode matrix 88 comprises a section of coaxial transmission line having an outer conductor 100 and an inner conductor 101. Four substantially equally spaced apertures 106, 107, 108, 109 are provided in the wall of outer conductor 100 in a common plane. A quadruple diode network is coupled between conductors 101 and ring conductor 114 consisting of diodes 102 to 105, poled as shown in the figure. Diode 102 connects inner conductor 101 through aperture 106 to junction 110 on ring conductor 114. Diode 103 connects inner conductor 101 through aperture 107 to junction 111 on ring conductor 114. Similarly, diodes 104 and 105 respectively connect inner conductor 101 through apertures 108 and 109 to junctions 112 and 113 on ring conductor 114. Ring conductor 114 is connected to the positve terminal of voltage source 115 through level setting resistor 116. Capacitor 117 is coupled across source 115 and resistor 116.

It will be apparent upon inspection of FIG. 11B that the diode matrix 94 shown therein is similar to that of FIG. 11A with certain exceptions. For example, diodes 102*a*, 103*a*, 104*a*, and 105*a* are poled oppositely to the respective diodes 102, 103, 104, and 105. Furthermore, ring conductor 114*a*, which supplies diodes 102*a* to 105*a*, is connected to the negative terminal of voltage source 115*a* through level setting resistor 116*a*.

Figure 12:
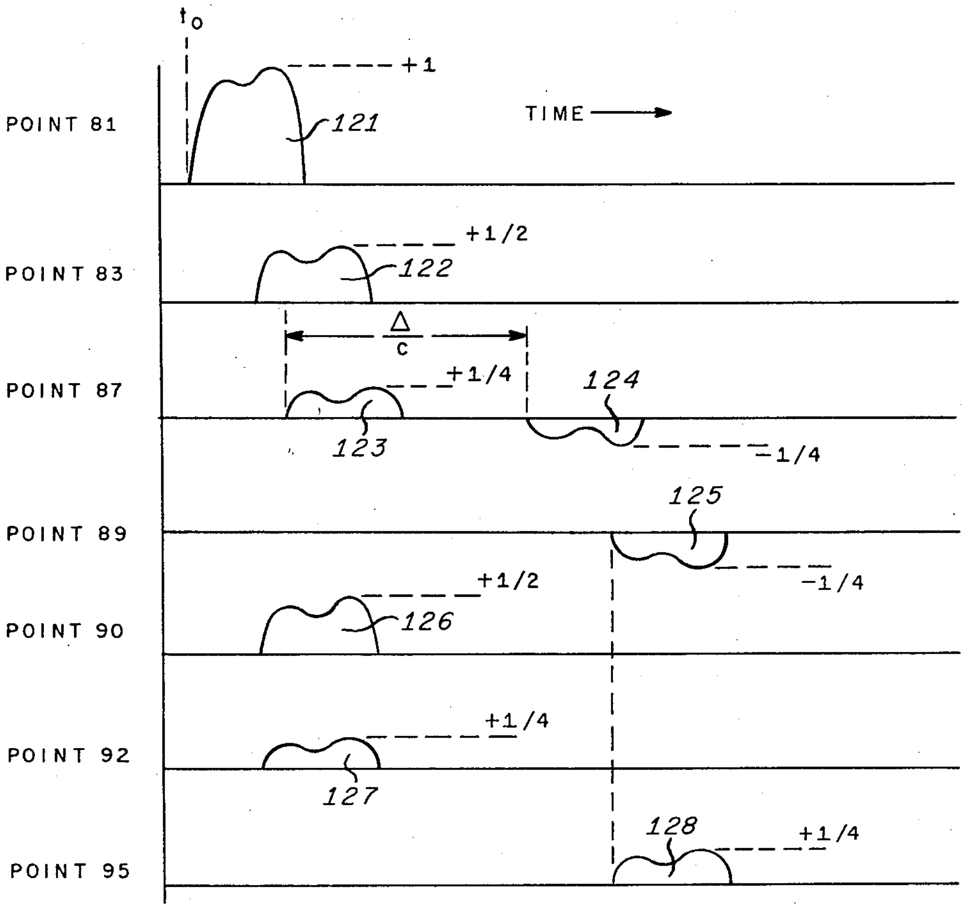
FIG. 12 is a series of graphs useful in explaining the operation of the apparatus of FIGS. 10, 11A and 11B.

In operation, the apparatus of FIGS. 10, 11A, and 11B is normally used in taking relatively long duration samples of signals flowing in the sampling network 3 and may be used particularly when samples of somewhat greater duration than one nanosecond are desired. An input signal of the general form of pulse 121 of FIG. 12 is fed by transmission line 81 to the input of T 82. Pulse 121 starts at time $t_0$ and has, for example a normalized amplitude of +1. If any mismatch is present at T 82, the part of the signal 121 is reflected and merely absorbed by the matched impedance of signal source 46. The signal 121 entering T 82 is fed in two directions via transmission lines 83 and 90. The signal fed into transmission line 83 is represented at 122 in FIG. 12 as a pulse of normalized amplitude +½. Signal 122 is incident upon the quadruply branched junction 84 which, in essence, places a single branching stub of length $\Delta/2$ across line 83. Therefore, there is a voltage loss of one-half at junction 84. The output on transmission line 87 is pulse 123 of FIG. 12, and it is fed to the diode matrix 94 as a pulse of normalized amplitude +¼.

Since voltage source 115, 116 supplies an appropriate voltage via ring conductor 114 to diodes 102 to 105, these diodes conduct abruptly and heavily in parallel when signal 123 arrives in their common plane. The consequence is that the directly transmitted positive signal 123 is fully attenuated by the conduction of diode matrix 94. On the other hand, the negative going and later arriving signal 124, whose normalized amplitude is −¼ and which resulted from the short-circuited stub network 85, 85*a*, appears on transmission line 87 a time $\Delta/c$ later than pulse 123, and is unaffected by diodes 102 to 105. Ultimately, it arrives on line 89 at output connection 29, 31 as the desired signal $-p(t)$ as represented by pulse 125 of the normalized amplitude −¼ in FIG. 12.

The signal flowing downward from T 82 through transmission line 90 is represented in FIG. 12 by pulse 126 of +½ normalized amplitude. It is attenuated by resistor or attenuator pad 91 by a factor of 6 db to form pulse 127, and is then delayed by a time equivalent to twice the effective length of the stub branch 85 by delay element 93 to form pulse 128 of normalized amplitude +¼. Pulse 128 is of desired opposite polarity, equal shape, and equal timing with respect to the $-p(t)$ pulse 125, and therefore is the useful $+p(t)$ output pulse permitted by diode matrix 88 to appear at output 28, 30.

Matrix 88 has diodes 102*a* to 105*a*, which may be also fast-switching hot carrier diodes, and a power source 115*a*, 116*a* poled in such a manner that it has no effect upon the desired output signal 128. Moreover, diode matrix 88 provides the same kind of discontinuity to the desired positive signal $+p(t)$ as the diodes in matrix 94 provide to the desired negative signal $-p(t)$, since the diodes of both matrices are simply open circuits to the desired signals. Any stray signals of undesired polarity appearing at diode matrix 88 cause it to conduct, preventing such signals from reaching output 28, 30.

It is to be noted that transmission of short-duration pulses from generator 46 in FIG. 10 through the transmission line system of the figure is preferably by use of a transmission medium affording energy transmission substantially solely in the TEM mode, and that propagation modes that permit dispersion or smearing of the short pulses which may, in fact, be subnanosecond duration pulses are not used. Thus, the energy of the short pulses from transmitter 46 is effectively directed to use in the sampling network 3. It should further be noted that the respective junctions 82, 84 and other elements of FIG. 10 may be made according to standard designs permitting substantially exact impedance matches over a wide frequency band. Furthermore, it will be understood that the proportions used in the drawings of FIGS. 10, 11A, and 11B are used for the purpose of providing clarity in the drawings, and do not necessarily represent proportions which would be employed in actual practice.

It is seen that the invention provides means for precise short-duration sampling of electromagnetic waves, either continuous or pulsed, wherein the sampling time and sampling duration depend only upon stable passive elements, and employs stable, balanced, non-dispersive transmission line elements for preventing distortion of the sampling and sampled signals. The invention is capable of operation at fast sampling rates upon radio frequency and other signals, permitting samples even as short as of subnanosecond duration to be taken. Accordingly, it is seen that the invention has application where prior art devices fail in the base band pulse sampling of signals in time domain technology, or in the sampling of echo signals in such proximity sensing apparatus as that disclosed by G. F. Ross in the United States patent application Ser. No. 134,990 for a "Base Band Pulse Object Sensor System," filed Apr. 19, 1971, and assigned to the Sperry Rand Corporation.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Sampling network means comprising:

transmission line means having outer conductor means and having inner conductor means said inner conductor means having respective first and second ends with a space therebetween and first and second respective high frequency signal conducting surfaces facing each other at said respective ends, series-related oppositely poled diode means directly connecting said first and said second respective signal conducting surfaces one to the other, said series-related oppositely-poled diode means comprising a plurality of dual diode paths directly connecting said first and said second signal conducting surfaces of said inner conductor means one to the other, said dual diode paths being spaced at substantially equal intervals about said space between said first and second ends, branching conductor means connected within said oppositely poled diode means for supplying bias voltage to said diode means, and circuit means, coupled to said branching conductor means, for coupling a sampling signal to said diode means for causing conductivity thereof.

2. Apparatus as described in claim 1 wherein said plurality of dual diode paths comprises an even number of said paths, half of said paths being supplied with a positive bias voltage and half with a negative bias voltage by said branching conductor means.

3. Apparatus as described in claim 2 wherein said circuit means, coupled to said branching conductor means, supplies substantially equal, opposite-polarity, and simultaneous balanced gating signals to the respective first and second halves of said plurality of said dual diode paths.

4. Means for providing balanced output signals comprising:

input transmission line means adapted to receive an input signal of a first polarity, first and second transmission line means branching from said input transmission line means, said first branching transmission line means comprising in series relation:

means for generating a delayed inverted version of said input signal of a first polarity comprising shorted branching stub transmission line means, and means preventing transmission of said input signal of first polarity comprising biased diode means connected across said first branching transmission line means, said second branching transmission line means comprising in series relation: delay means, and means preventing transmission of signals inverted with respect to said signal of a first polarity, said input and said first and second branching transmission line means being so constructed and arranged as to generate substantially equal, opposite polarity, and simultaneous balanced output signals on said first and second branching transmission line means in response to supply of said input signal of a first polarity.

5. Apparatus as described in claim 4 wherein said means for preventing transmission of signals inverted with respect to said signal of a first polarity comprises biased diode means connected across said second branching transmission line means.

6. Apparatus as described in claim 5 wherein said second branching transmission line means further comprises series connected attenuator means.

7. Apparatus as described in claim 5 wherein said input signal generator comprises base band pulse generator means.

8. Apparatus as described in claim 5 further comprising:

sampling network means having first and second states and input and output means for transmission therethrough of sampled signals, and means for receiving said substantially equal, opposite, and simultaneous signals for causing said sampling network to change state.

9. Means for providing balanced output signals comprising:

first transmission line means having first and second signal coupling means connected in series relation between input signal generator means and matched termination means, second transmission line means comprising in series relation:

shorting termination means, third means for signal coupling in coupled relation with said first means for signal coupling, delay means, and first output means, third transmission line means having fourth means for signal coupling in coupled relation with said second means for coupling, said first, second, and third transmission line means and said delay means being so constructed and arranged as to generate substantially equal, opposite polarity, and simultaneous balanced output signals on said second and third transmission line means in response to supply of input signals on said first transmission line means.

10. Apparatus as described in claim 9 wherein said third transmission line means is connected in series relation between:

matched termination means, and second output means.

11. Apparatus as described in claim 10 further comprising:

sampling network means having first and second states and input and output means for transmission therethrough of sampled signals, and means for receiving said substantially equal, opposite, and simultaneous signals for causing said sampling network to change state.

12. Apparatus as described in claim 10 wherein said first, second, and third transmission line means comprise planar conductor means bonded to a common dielectric substrate.

13. Apparatus as described in claim 12 wherein said input signal generator means comprises base band pulse generator means.

References Cited

UNITED STATES PATENTS

| | | | |
|---|---|---|---|
| 2,897,456 | 7/1959 | Geppert | 333—26 X |
| 3,459,969 | 8/1969 | Jasper | 307—257 X |
| 3,493,898 | 2/1970 | Ward | 333—11 |
| 3,058,071 | 10/1962 | Walsh et al. | 333—11 |
| 3,490,054 | 1/1970 | Seidel | 333—10 |
| 3,596,191 | 7/1971 | Stuckert | 307—257 X |
| 3,075,086 | 1/1963 | Mussard | 307—257 X |

PAUL L. GENSLER, Primary Examiner

U.S. Cl. X.R.

307—257; 333—6, 10, 11, 26, 97 S